3,188,303
PROCESS AND PRODUCT RELATING TO THE REACTION OF DICYCLOPENTADIENE AND α,β DI- AND TRI-CARBOXYLIC ACIDS
Israel J. Dissen, Chicago, Ill., assignor to Velsicol Chemical Corporation, Chicago, Ill., a corporation of Illinois
No Drawing. Filed Mar. 17, 1961, Ser. No. 96,353
15 Claims. (Cl. 260—78.4)

This invention relates to the products formed by the reaction of cis-isomeric α,β-monounsaturated di- and tricarboxylic acids or anhydrides with dicyclopentadiene and more particularly with the reaction at temperatures below the substantial dedimerization point of dicyclopentadiene in the presence of free radicals.

In the past, reactions of the acid derivative with dicyclopentadiene have been carried out at temperatures above the dedimerization temperature of dicyclopentadiene. In such reactions the dicyclopentadiene depolymerizes to a considerable extent to cyclopentadiene, thereby permitting the more reactive cyclopentadiene to react with the dicarboxylic acid derivative.

The reaction of cis-isomeric α,β-monounsaturated di- and tricarboxylic acid or anhydride with dicyclopentadiene is distinctly different from the reaction with cyclopentadiene. Cyclopentadiene is a conjugated diene and the α,β-monounsaturated di- or tricarboxylic acid derivative is a dienophile. The reaction between a conjugated diene and a dienophile is commonly called a Diels-Alder adduction. When the dicarboxylic acid reactant is used, the adduction will form a bicyclic structure having carboxylic acid radicals on adjacent carbon atoms. When the dicarboxylic acid anhydride is utilized as a dienophile, a tricyclic structure is formed, one ring containing an oxygen atom within the ring, and the two adjacent ring carbon atoms being part of keto radicals.

The reactants of the reaction in the present invention do not include a conjugated diene. Dicyclopentadiene is a tricyclic diene with the double bonds recognized to be neither on the same carbon atom nor on adjacent carbon atoms, and therefore not a conjugated diene. The reaction temperature throughout the reaction of the present invention is so controlled that the dicyclopentadiene remains in its dimerized state and does not dedimerize to cyclopentadiene, a phenomenon which ordinarily occurs to a considerable extent at temperatures above about 115° C.

Furthermore, the Diels-Alder adduction reaction of cyclopentadiene and α,β-unsaturated dicarboxylic acid derivative will proceed both in the presence and absence of a catalyst. Encompassed in this invention is the newly discovered fact that the reaction of dicyclopentadiene and an α,β-monounsaturated cis-isomeric di- or tricarboxylic acid or anhydride requires the presence of a reaction initiator, such as free radicals.

The reaction products of the present invention are distinctly different from the reaction products of cyclopentadiene and α,β-unsaturated dicarboxylic acid derivatives. The reaction products of this invention are powdery brittle solids, which do not melt at temperatures below 300° C., at which temperature they begin to decompose; whereas the reaction products of the cyclopentadiene reaction usually melt in the temperature range of from about 30° C. to well below 300° C.

It is known that the carboxylic acid radicals are not reacted during the cyclopentadiene adduction reaction. In contrast, the reaction products of the present invention indicate that half of the acid radicals are reacted during the reaction. This evidence proves that the reaction does not proceed according to the previously known adduction reaction, but instead reacts through the carboxyl or carbonyl group, depending upon whether the acid or anhydride is used.

This reaction is further distinguished from the previously known adduction reaction, wherein other derivatives of the unsaturated acids, such as the nitriles, esters, and amides could be reacted in place of the acid or anhydride. These other derivatives of α,β-unsaturated di- and tricarboxylic acids will not react with dicyclopentadiene even in the presence of free radicals. The adduction reactions, which claim to react dicyclopentadiene with the acid derivatives, merely heat the dicyclopentadiene until it dedimerizes to cyclopentadiene and then react the cyclopentadiene with said acid derivatives.

The reaction products of the present invention are brittle powdery copolymers which are insoluble in most of the common nonpolar solvents, such as benzene, heptane, hexane, toluene, xylene, and the like.

The reaction products of this invention are especially useful as fillers and extenders for shellacs, paints and varnishes. These products are also useful as extenders for waxes and polishes, especially when solubilized with ammoniacal solutions or amine solutions, such as ethylamine, diethanolamine, morpholine, and the like.

Thus, one object of the present invention is to provide extenders and fillers for shellacs, paints, and varnishes.

Another object of the present invention is to provide extenders and fillers for waxes and polishes.

Another object of the present invention is to provide solvent resistant polymers which can be solubilized by combination with ammoniacal solutions.

These and other objects of the present invention will become apparent from the following description and examples.

The reaction products of this invention can be readily prepared by reacting a cis-isomeric-α,β-unsaturated di- or tricarboxylic acid or anhydride, preferably those containing 4–6 carbon atoms, or combinations thereof, with dicyclopentadiene in the presence of a free radical catalyst. Cis-α,β-unsaturated di- and tricarboxylic acids and anhydrides, which are preferred reactants in the process of this invention, are: maleic acid, maleic anhydride, citraconic acid, citraconic anhydride, cis-aconitic acid, and cis-aconitic anhydride.

More specifically, an approximately equimolar quantity of the said α,β-unsaturated cis-isomeric di- or tricarboxylic acid or derivative is intimately mixed with an approximately equimolar quantity of dicyclopentadiene in the presence of free radicals which are formed in situ by adding to the solution from about 0.5 to about 5% of a free radical catalyst described herein and controlling the temperature until the reaction is complete.

It is preferred to perform the above reaction in any of the common organic solvents, such as benzene, heptane, dioxane, methyl isobutyl ketone, toluene, and xylene. The reaction can also be performed without a solvent by using an excess amount of dicyclopentadiene.

The type of solvent utilized in the reaction appears to partially control the characteristics of the resulting reaction product. For instance, the reaction performed with an aliphatic or aromatic solvent will produce a copolymer which is insoluble in most of the common solvents, such as benzene, toluene, dioxane, and the ketone solvents, whereas the product prepared in dioxane or a ketone solvent is soluble in dioxane and ketone solvents.

The exact reaction temperature is critical in that the temperature must be kept low enough to insure no greater than an inconsequential amount of dedimerization of the dicyclopentadiene. The exact temperature will be determined by the free radical catalyst used to initiate and sustain the reaction. Generally, free radical sources selected from organic peroxides, hydroperoxides, oximes, nitriles, azoalkyls, azoaromatics, and diazoaromatic compounds are suitable catalysts to initiate and sustain the reaction of the present invention. More particularly, the following compounds are especially useful as free radical sources: triphenyl methyl azobenzene, 2-azopropane, diazoaminobenzene, diazo-amino-p-toluene, benzene diazodimethyl amide, tetraphenyl succinic acid dinitrile, acetaldehyde, 2,4-dichlorobenzoyl peroxide, lauryl peroxide, di-t-butyl peroxide, benzoyl peroxide, acetoxime, di-ethyl ketoxime, methyl propyl ketoxime, acetophenone oxime, pinacoline oxime, methyl decyl oxime, acetone hydrazone, acetaldazine, dimethyl ketazine, methyl-n-propyl ketazine, methyl-n-butyl ketazine, methyl phenyl ketazine, methyl decyl ketazine, azobisisobutyronitrile, 1-azocyclohexane carbonitrile, and di-t-amyl peroxide.

Each of the above compounds dissocates at a rate dependent upon the reaction temperature. Thus, depending upon the free radical source utilized, the reaction temperature may vary from about 0° C., at which temperature only the most active free radical forming compounds will initiate and sustain the reaction, to about 115° C. at which temperature the dedimerization rate of dicyclopentadiene is still negligible. At higher temperatures the dedimerization is appreciable, forming the adduct of cyclopentadiene and di- or tricarboxylic acid derivative. The boiling point of dicyclopentadiene is approximately 170° C. At this point dedimerization occurs rapidly and the reaction of this invention would be negligible, while the cyclopentadiene adduction reaction would be substantial.

The reaction time is a function of both the particular free radical source and the reaction temperature. Each of the compounds listed as free radical sources dissociates at a rate which varies with the temperature. Thus, a longer reaction time is needed when a given free radical source is used at a low temperature than when used at a higher temperature.

Azobisisobutyronitrile is a compound which dissociates at a rate faster than the dissociation rate of benzoyl peroxide. For instance, at 80° C. the half-life of azobisisobutyronitrile is approximately 1½ hours. Therefore, a shorter reaction time is required when azobisisobutyronitrile is the free radical source than when benzoyl peroxide is used as the source.

The following table contains a list of preferred free radical sources and their approximate half-life at the specified temperatures.

TABLE I

Free radical source:     Approx. half-life in hrs.
    Azobisisobutyronitrile_____ 1.5 at 80° C.
    Lauryl peroxide_____ 3.5 at 70° C.
    Benzoyl peroxide_____ 6 at 80° C.
    1-azocyclohexane carbonitrile _____ 1.8 at 100° C.
    t-Butyl perbenzoate_____ 3.1 at 115° C.

The reaction product precipitates and settles out of solution when either an aliphatic solvent, an aromatic solvent, or excess dicyclopentadiene is used as the reaction solvent. The reaction product is filtered from the solution and is washed with inert solvent, such as benzene, toluene, hexane, heptane, etc. The solid product is then washed with hot water to remove any unreacted dicarboxylic acid or anhydride and is filtered from the water and dried.

If dioxane or a ketone is used as the reaction solvent, the reaction product is soluble in the solvent and will not precipitate. To isolate the reaction product any of the isolation and purification means common to the art may be used. For instance, concentration of the product by stripping the solvent from the solution until the concentrated solution is slightly viscous and then slowly pouring the concentrated solution into a substantial quantity of an aliphatic or aromatic solvent, such as hexane. In this manner the reaction product is precipitated from the reaction solvent, due to the large concentration of aliphatic or aromatic solvent. Unreacted reactants are then removed as previously described and the reaction product is filtered and dried.

The following examples illustrate the preparation and usefulness of the reaction product.

*Example 1*

Dicyclopentadiene (43 grams; 0.3 mole), maleic anhydride (32 grams; 0.33 mole), benzoyl peroxide (1.5 gram) and benzene (75 grams) were placed in a 300 ml. round-bottom three-neck flask fitted with stirrer, reflux condenser, thermometer, and heating mantle. The reaction solution was stirred and the reaction temperature raised to about 86° C. The reaction proceeded for approximately 2 hours at the stated temperature. At the end of this time the solution appeared hazy.

The reaction solution was poured onto a Buchner funnel and filtered. The mass on the filter was washed with hot water, dried, washed with pentane, and finally dried under vacuum on a steam bath to a brittle solid.

The solid did not melt upon heating up to 400° F. The reaction product was insoluble in heptane and butanol. When methyl isobutyl ketone, dioxane, benzene, and chloroform were added, each to separate portions of the product, the product swelled slightly and became generally translucent. The results of a carbon hydrogen analysis are given below compared with the theoretical analysis for 1:1 molar copolymer of dicyclopentadiene with maleic anhydride:

|  | C | H | O (by difference) |
|---|---|---|---|
| Maleic anhydride copolymer | 73.02 | 6.13 | 20.85 |
| Product of Example 1 | 72.53 | 6.25 | 21.22 |

When heated with glycerol up to 400° F. the product of Example 1 did not melt.

*Example 2*

Dicyclopentadiene (43 grams; 0.3 mole), maleic anhydride (32 grams; 0.33 mole), benzoyl peroxide (1.5 grams) and heptane (225 grams) were placed in a 500 ml. round-bottom three-neck flask fitted with stirrer, reflux condenser, thermometer, and heating mantle. The solution was stirred and slowly heated. At about 50° C. the maleic anhydride dissolved into solution. After 2 hours the solution became hazy. The temperature was held at 86° C. for about 7 additional hours. The solution was very hazy and a dark material had precipitated to the bottom of the flask.

The reaction solution was cooled and then poured over a filter and washed with hexane. The mass in the filter was then washed with hot water and dried under vacuum on a steam bath. The product obtained therefrom was identical to the product of Example 1.

*Example 3*

Dicyclopentadiene (225 grams; 1.55 moles) and maleic anhydride (45 grams; 0.46 mole) were charged into a 500 ml. flask fitted with stirrer, reflux condenser, thermometer, and heating mantle. Benzoyl peroxide (2.1 grams) was added. The solution was stirred and heated to about 86° C. at which temperature the reaction was maintained for several hours. After 7 hours much frothing was observed.

The reaction solution was cooled and poured into a sintered glass funnel and the dicyclopentadiene solvent removed by applying vacuum. Approximately 200 grams of dicyclopentadiene were recovered in this manner. The mass in the funnel was washed several times with pentane, and then dried on a steam bath. The dried product was then washed with water and dried. The product analysis which follows indicates that the product was a mixed copolymer of 1:1 molar maleic acid and 1:1 molar maleic anhydride with dicyclopentadiene:

|  | C | H | O (by difference) |
|---|---|---|---|
| Maleic anhydride copolymer | 73.02 | 6.13 | 20.85 |
| Product of Example 3 | 68.85 | 5.9 | 25.2 |
| Maleic acid copolymer | 67.72 | 6.50 | 25.78 |

The product of Example 3 (5.75 grams) and ethyl hexanol (6.5 grams) were charged into a test tube with 2 crystals of p-toluene sulfonic acid. The tube was heated and stirred occasionally. A viscous product was thus obtained.

The product of Example 3 (11.5 grams) was also charged with n-octadecanol (27.05 grams) into a beaker equipped with a stirrer and heated by an oil bath. The mixture was heated to 400° F. and a viscous mixture was formed. Upon cooling, a waxy solid resulted.

Example 4

Dicyclopentadiene (198 grams; 1.35 moles), maleic anhydride (147 grams; 1.5 moles), benzoyl peroxide (6.9 grams), and dioxane (200 grams) were charged into a 1-liter, three-neck, round-bottom flask equipped with stirrer, reflux condenser, thermometer, and heating mantle. The contents of the flask were stirred and brought up to and maintained at a temperature of approximately 80° C. for 24 hours. The contents of the flask had become very viscous.

The viscous solution was slowly poured into about 1 liter of vigorously stirred hexane and the hexane mixture was agitated until the product appeared as a powder. The mixture was poured into a sintered glass funnel and the resulting mass washed several times with pentane and dried by suction. The dried product weighed 258 grams, which was an over-all yield of 75%. The product had the following elemental analysis, which indicated that the product contained approximately equivalent amounts of 1:1 molar maleic acid and 1:1 molar maleic anhydride copolymers:

|  | C | H | O (by difference) |
|---|---|---|---|
| Maleic anhydride copolymer | 73.02 | 6.13 | 20.85 |
| Product of Example 4 | 70.25 | 6.12 | 23.36 |
| Maleic acid copolymer | 67.72 | 6.50 | 25.78 |

The reaction product of Example 4 was insoluble in the aromatic and aliphatic solvents, but was soluble in dioxane and ketone solvents, such as methyl isobutyl ketone. The product reacted with concentrated ammonium hydroxide became exothermic and upon drying yielded a brittle crystalline product.

Example 5

Dicyclopentadiene (79 grams; 0.55 mole), maleic acid (66.3 grams; 0.57 mole), and benzoyl peroxide (3.2 grams) along with benzene (150 grams) were charged into a 500 ml. three-neck, round-bottom flask fitted with stirrer, reflux condenser, thermometer, and heating mantle. The reaction was stirred at approximately 80° C., while the benzene refluxed for approximately 12 hours. At the end of this time a powdery precipitate was noted. The mixture was poured into a sintered glass funnel and washed several times with pentane and dried overnight. The product was then washed with hot water and dried by vacuum on a steam bath. The dried product did not melt when it was heated up to 305° C.

Example 6

Dicylopentadiene (79 grams; 0.55 mole), citraconic anhydride (62 grams; 0.55 mole), and lauryl peroxide (5 grams) along with 150 grams methyl ethyl ketone are charged into a 500 ml. three-neck, round-bottom flask fitted with stirrer, reflux condenser, thermometer, and heating mantle. The reaction is stirred at approximately 65° C. for approximately 3 hours. At the end of this period the solution is relatively viscous. The solution is subjected to vacuum until the product becomes very viscous and approximately 80 grams of solvent are removed.

The viscous solution is slowly poured into about 800 grams of vigorously stirred hexane and stirring is continued until the product appears as a powder. The mixture is then poured onto a sintered glass funnel, washed several times with pentane, dried by suction, washed several time with water, and finally dried by suction on a steam bath. The product is thus recovered as a dried powder.

Example 7

Dicyclopentadiene (132 grams; 1 mole), acetone (approximately 150 grams), and benzoyl peroxide (3 grams) are charged into a 1-liter, three-neck, round-bottom flask fitted with a stirrer, thermometer, and cooling bath, stirred, and cooled at 0° C. In another flask, cis-aconitic acid (174 grams; 1 mole) is mixed with N,N-dimethylparatoluidine (10 grams of a 0.2% by weight acetone solution) in the presence of acetone (150 grams) and cooled to 0° C. This second solution is added to the 1-liter flask and the reactants are stirred at 0° C. The reaction begins after approximately 1 hour. After about 4 additional hours, the stirrer is stopped. The reaction solution is relatively viscous. The solution is subjected to vacuum until the product becomes very viscous and approximately 175 grams of solvent are removed.

The viscous solution is slowly poured into about 1500 grams of vigorously stirred hexane and stirring is continued until the product appears as a powder. The mixture is then poured onto a sintered glass funnel, washed several times with pentane, dried by suction, washed several times with water, and finally dried by suction on a steam bath. The product is thus recovered as a dried powder.

Almost all of the compounds listed herein as sources of free radicals dissociate only to a negligible degree at low temperatures, such as 0° C. Therefore, an activator is required to promote dissociation at low temperatures. An example of such an activator is a tertiary amine, preferably with at least one aromatic radical substituted thereon. Suitable activators, which may be used with organic peroxides to form free radicals at low temperatures, as described herein, are N,N-dimethylparatoluidine, 2-N-methylanilinoethanol, paratolyldiethanolamine, and the ferrous ion. Thus, the combination of an activator and a free radical source as described herein facilitates the preparation of the products of the present invention over a wide temperature range.

The term "free radical catalyst" as employed herein refers to a free radical source which dissociates into free radicals at the conditions of the process involved herein, either with or without a dissociation activator.

An attempt was made to react dicyclopentadiene with maleic anhydride in benzene solvent without a free radical source. The reaction mixture was stirred at 86° C. with the solvent refluxing for approximately 6 hours. No reaction was observed and no product precipitated from solution, even after cooling to room temperature.

Floor waxes made with shellac have been known for many years. A typical no-rub shellac wax which was popular in the past consisted of about 90 to 80% wax solution and about 10 to 20% shellac solution. Generally, the wax solutions are water soluble wax emulsions. A typical wax emulsion would contain about 10% carnauba wax or a mixture of suitable waxes, such as candillia or ouricuri, about 2% maleic acid, and about 1.5% emulsifier, such as morpholine, monoethanolamine, diethanolamine, borax, ammonia, and the rest water.

In recent years hard surface waxes have become very popular and their demand was met by increasing the shellac content up to three times their previous quantity. The reaction products of this invention are useful as extenders and fillers for shellac, especially shellac used in floor waxes. Although the present products are insoluble in borax, resin products from the reactions in which dioxane or one of the ketones was the solvent medium are soluble in morpholine, mono- and diethanolamine and ammoniacal solutions and are even soluble in the simple alcohols when mixed with a second solvent in which the products are soluble.

A film produced by the dioxane-ketone soluble reaction product with shellac in a dioxane and isopropyl alcohol solvent mixture dried to a continuous film exhibiting only a slight blush. The reaction product when mixed with shellac on a 50–50 weight basis in aqueous ammoniacal shellac solution produced a strong, clear, glossy, non-tacky film.

I claim:

1. A process which comprises reacting a compound selected from the group consisting of cis-$\alpha,\beta$-monounsaturated di- and tricarboxylic acids containing 4 to 6 carbon atoms, their anhydrides and mixtures thereof, and dicyclopentadiene at a temperature between about 0° C. and about 115° C. in the presence of a free radical catalyst.

2. A process which comprises reacting a compound selected from the group consisting of cis-$\alpha,\beta$-monounsaturated di- and tricarboxylic acids containing 4 to 6 carbon atoms, their anhydrides and mixtures thereof, and an approximately equimolar amount of dicyclopentadiene at a temperature between about 0° C. and about 115° C. in the presence of from about 0.5 to about 5% by weight of the two reactants of a free radical catalyst.

3. A process which comprises reacting a compound selected from the group consisting of cis-$\alpha,\beta$-monounsaturated di- and tricarboxylic acids containing 4 to 6 carbon atoms, their anhydrides and mixtures thereof, and an approximately equimolar amount of dicyclopentadiene at a temperature between about 65° C. and about 95° C. in the presence of from about 0.5 to about 5% by weight of the reactants of a free radical catalyst.

4. The process of claim 3 wherein the free radical catalyst is benzoyl peroxide.

5. A process which comprises reacting maleic anhydride with an approximately equimolar amount of dicyclopentadiene at a temperature between about 65° C. and about 95° C. in the presence of from about 0.5 to about 5% by weight of reactants of benzoyl peroxide.

6. A process which comprises reacting maleic acid with an approximately equimolar amount of dicyclopentadiene at a temperature between about 65° C. and about 95° C. in the presence of from about 0.5 to about 5% by weight of reactants of benzoyl peroxide.

7. A process which comprises reacting citraconic acid with an approximately equimolar amount of dicyclopentadiene at a temperature between about 65° C. and about 95° C. in the presence of from about 0.5 to about 5% by weight of reactants of benzoyl peroxide.

8. A process which comprises reacting citraconic anhydride with an approximately equimolar amount of dicyclopentadiene at a temperature between about 65° C. and about 95° C. in the presence of from about 0.5 to about 5% by weight of reactants of benzoyl peroxide.

9. A process which comprises reacting cis-aconitic acid with an approximately equimolar amount of dicyclopentadiene at a temperature between about 65° C. and about 95° C. in the presence of from about 0.5 to about 5% by weight of reactants of benzoyl peroxide.

10. The product of the process of claim 1.
11. The product of the process of claim 5.
12. The product of the process of claim 6.
13. The product of the process of claim 7.
14. The product of the process of claim 8.
15. The product of the process of claim 9.

References Cited by the Examiner

UNITED STATES PATENTS 2,608,550   8/52   Rowland et al. _____ 260—78.5

OTHER REFERENCES

Noller: "Chemistry of Organic Compounds," W. B. Saunders Co., 1951, page 766 relied upon.

Richter: "Organic Chemistry," vol. II, 1919, page 15 relied upon.

JOSEPH L. SCHOFER, *Primary Examiner.*

LEON J. BERCOVITZ, DONALD E. CZAJA,
*Examiners.*

UNITED STATES PATENT OFFICE
CERTIFICATE OF CORRECTION

Patent No. 3,188,303 June 8, 1965

Israel J. Dissen

It is hereby certified that error appears in the above numbered patent requiring correction and that the said Letters Patent should read as corrected below.

Column 3, line 13, for "azobisobutyronitrile" read -- azobisisobutyronitrile --; column 5, in the last table, last column, line 2 thereof, for "23.36" read -- 23.63 --; column 6, line 13, for "time" read -- times --; line 72, for "maleic" read -- aleic --.

Signed and sealed this 7th day of December 1965.

(SEAL)
Attest:

ERNEST W. SWIDER
Attesting Officer

EDWARD J. BRENNER
Commissioner of Patents